(12) United States Patent
Kretschmer

(10) Patent No.: US 8,672,589 B2
(45) Date of Patent: Mar. 18, 2014

(54) HOB

(75) Inventor: Armin Kretschmer, Schwabach (DE)

(73) Assignee: Kennametal Inc., Latrobe, PA (US)

( * ) Notice: Subject to any disclaimer, the term of this patent is extended or adjusted under 35 U.S.C. 154(b) by 213 days.

(21) Appl. No.: 13/133,453

(22) PCT Filed: Oct. 13, 2009

(86) PCT No.: PCT/EP2009/007346
§ 371 (c)(1),
(2), (4) Date: Jun. 8, 2011

(87) PCT Pub. No.: WO2010/072280
PCT Pub. Date: Jul. 1, 2010

(65) Prior Publication Data
US 2011/0243671 A1 Oct. 6, 2011

(30) Foreign Application Priority Data

Dec. 16, 2008 (DE) .......................... 10 2008 062 147
Apr. 3, 2009 (DE) .......................... 10 2009 016 257

(51) Int. Cl.
*B23F 21/16* (2006.01)

(52) U.S. Cl.
USPC .............................................. 407/23; 407/25

(58) Field of Classification Search
USPC ............................................... 407/23, 25, 29
See application file for complete search history.

(56) References Cited

U.S. PATENT DOCUMENTS

| | | | |
|---|---|---|---|
| 4,464,086 A * | 8/1984 | Bentjens | 407/25 |
| 5,232,316 A * | 8/1993 | Tennutti | 407/23 |
| 2007/0172316 A1* | 7/2007 | Jacob et al. | 407/23 |

FOREIGN PATENT DOCUMENTS

| | | |
|---|---|---|
| CN | 101108432 A | 1/2008 |
| CN | 101249576 A | 8/2008 |
| DE | 27 00 525 A1 | 7/1978 |
| DE | 102005029053 A1 * | 1/2007 |
| EP | 0 050 270 A2 | 4/1982 |
| EP | 0 109 034 A1 | 5/1984 |
| JP | 60099520 A * | 6/1985 |
| JP | 61131810 A * | 6/1986 |
| JP | 2000233321 A * | 8/2000 |
| JP | 2001353621 A * | 12/2001 |
| JP | 2005271150 A * | 10/2005 |
| RU | 2169061 C2 * | 6/2001 |
| SU | 1189608 A * | 11/1985 |

OTHER PUBLICATIONS

Machine Translation of previously cited foreign patent reference DE 10 2005 029 053.*

* cited by examiner

*Primary Examiner* — Daniel Howell
*Assistant Examiner* — Nicole N Ramos
(74) *Attorney, Agent, or Firm* — Larry R. Meenan, Esq.

(57) ABSTRACT

A hob having a helically curved tooth profile. A plurality of segments covering only a limited angle range are attached to a base body for forming the tooth profile. The segments abut each other in the circumferential direction of the base body, and the segments form rows in the direction of the longitudinal axis of the base body. The segments each comprise a segment foot and a segment profile disposed diagonally thereon. The diagonal arrangement of the segment profile forms a coiled slope of the helically curved tooth profile in each segment and the tooth profile can be built up simply by arranging the segments in rows in the circumferential and the longitudinal directions.

11 Claims, 5 Drawing Sheets

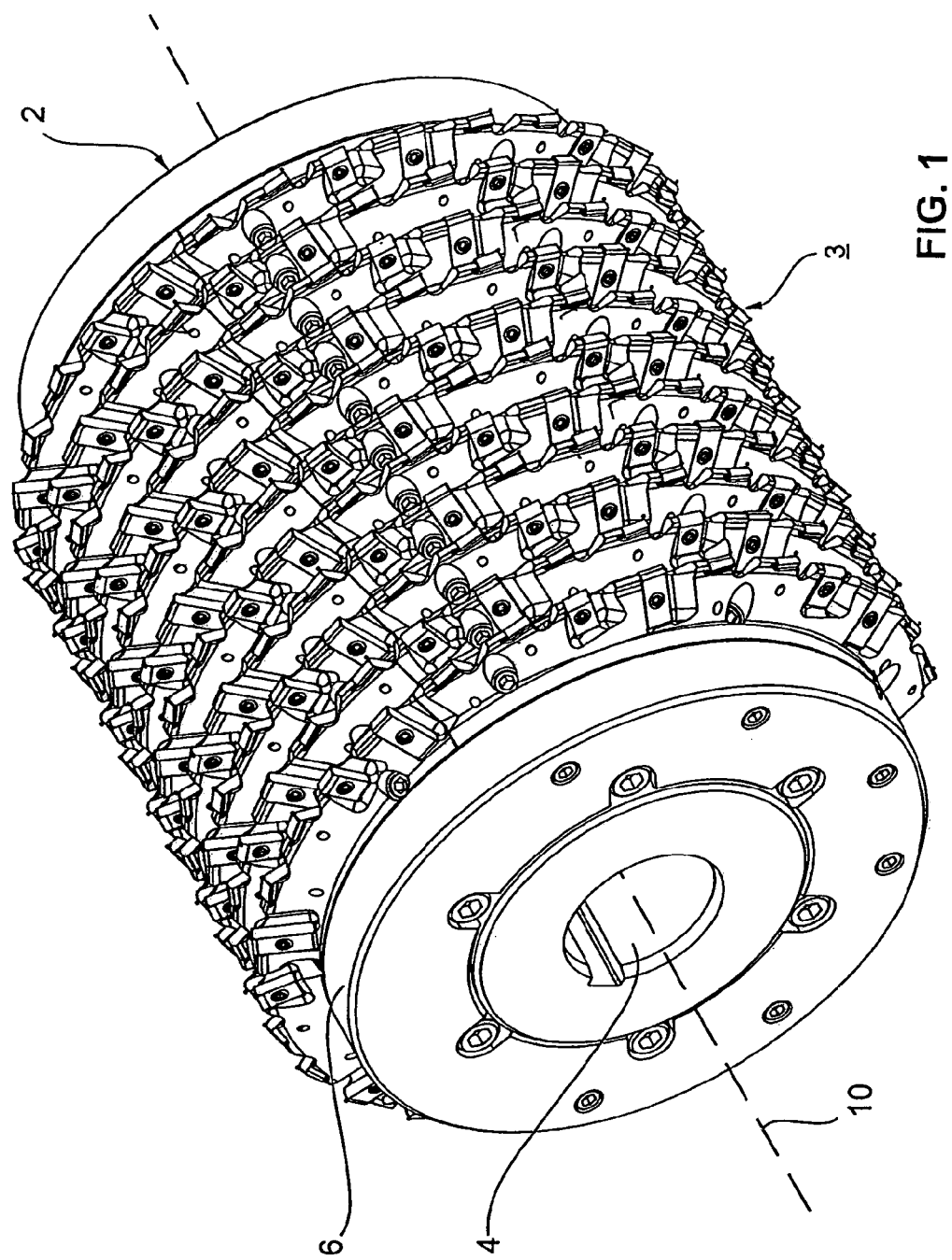

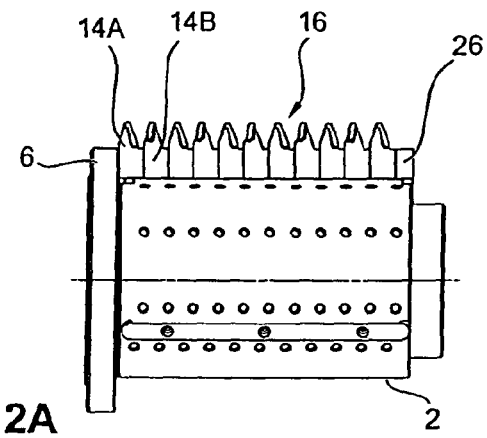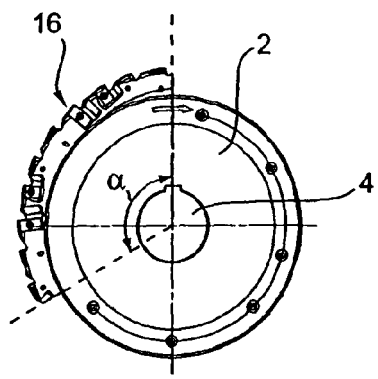
FIG. 2A
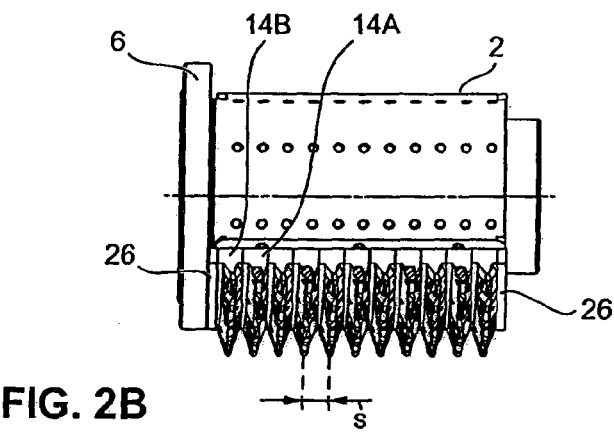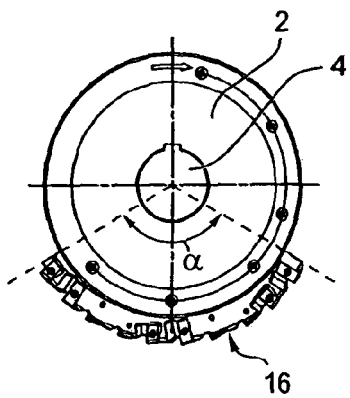
FIG. 2B
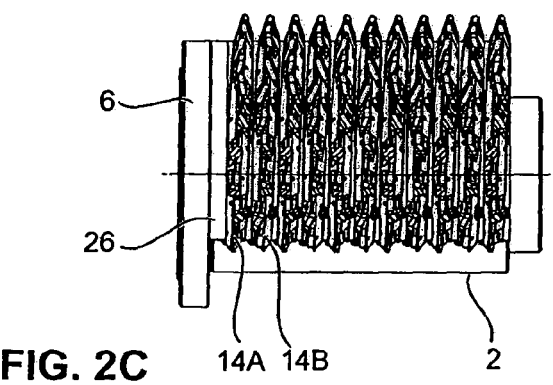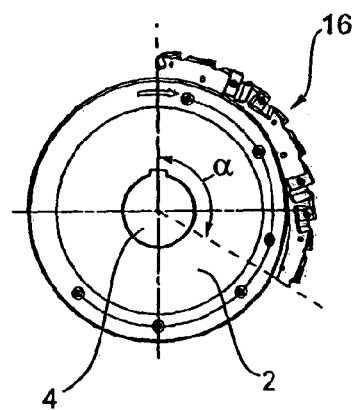
FIG. 2C

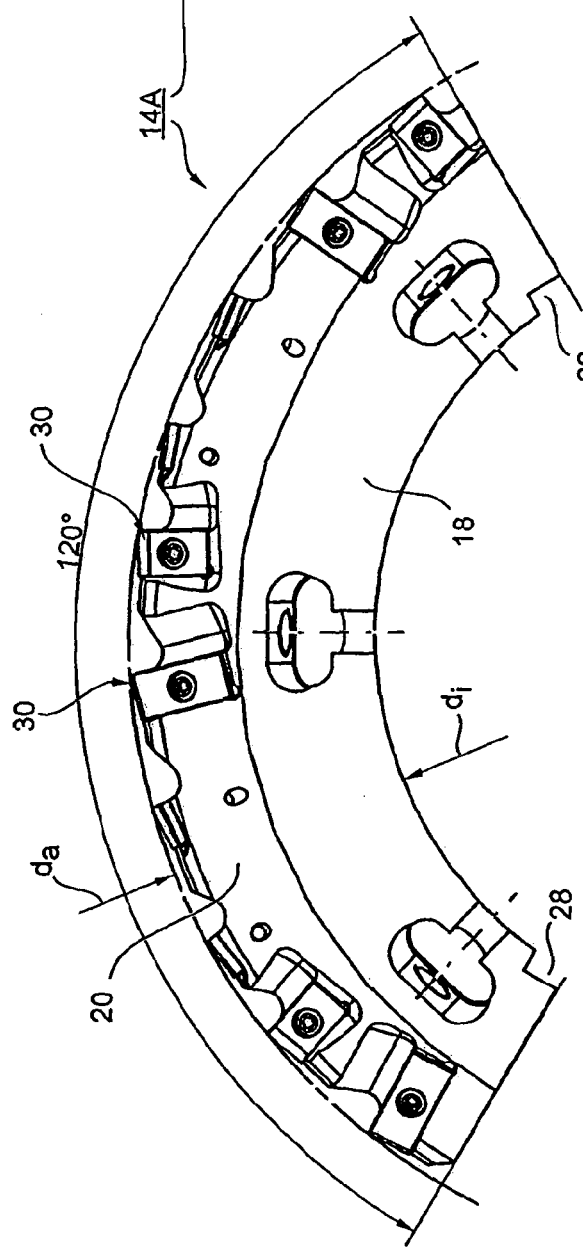
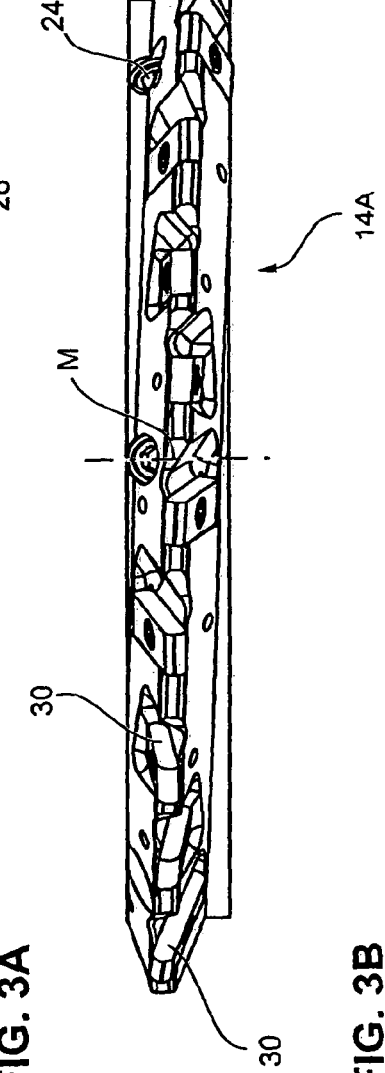
FIG. 3A
FIG. 3B
FIG. 3C

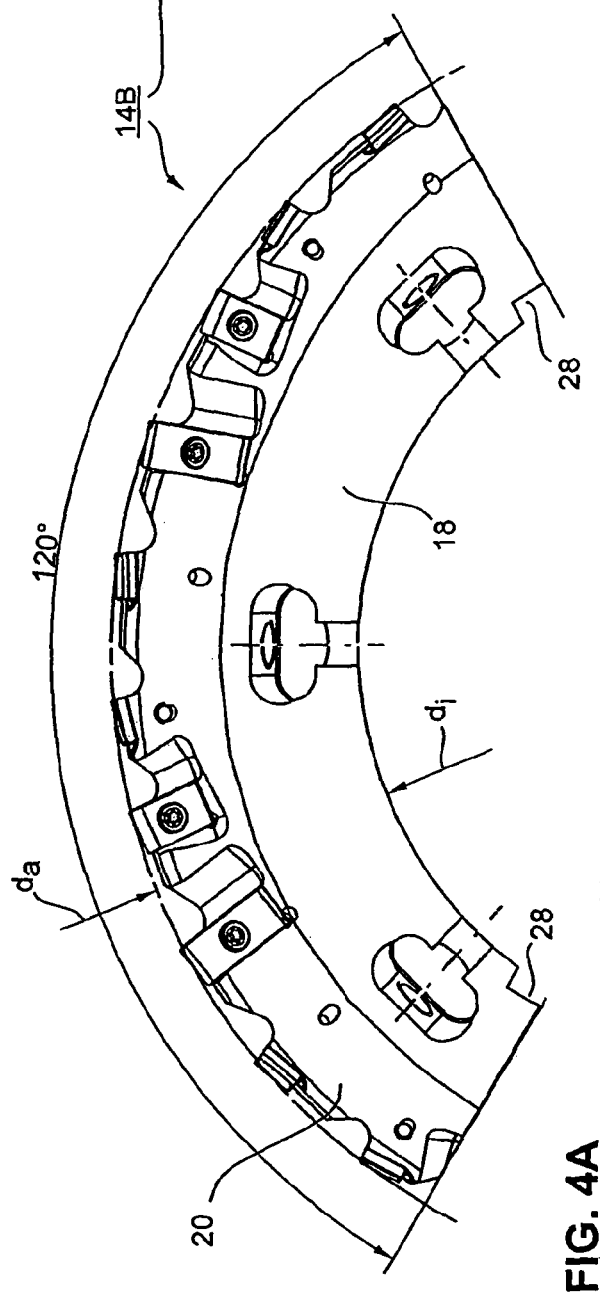
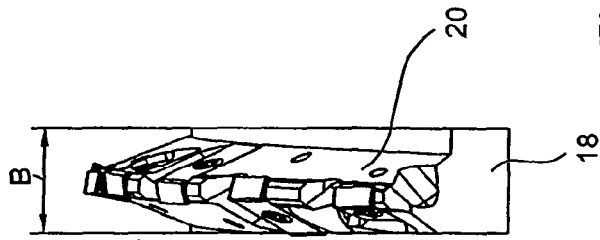
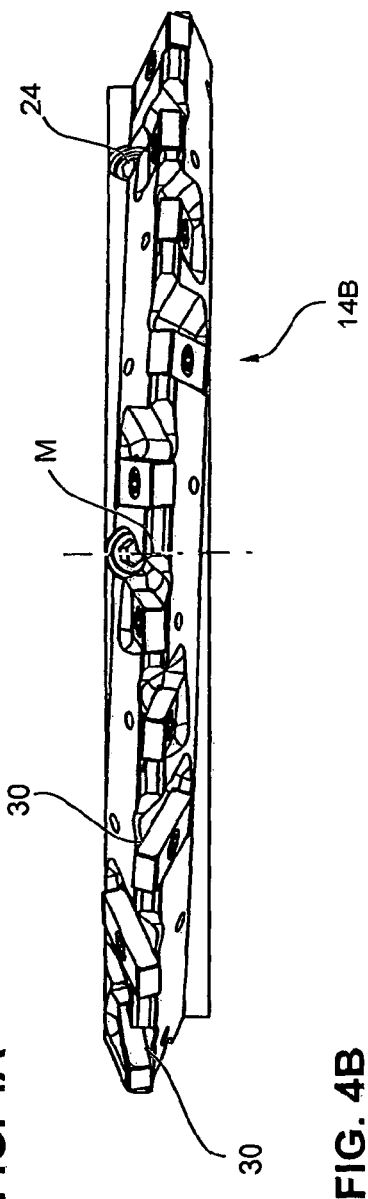
FIG. 4A
FIG. 4B
FIG. 4C

HOB

CLAIM TO PRIORITY

This application is a National Phase of International Application PCT/EP2009/007346, filed on Oct. 13, 2009, which claims priority to German Application No. 10 2008 062 147.1, filed on Dec. 16, 2008 and German Application No. 10 2009 016 257.7, filed on Apr. 3, 2009, the entire contents of all of these applications are incorporated herein by reference.

BACKGROUND OF THE INVENTION

1. Field of the Invention

The invention relates to a hob having a helical tooth profile.

2. Description of Related Art

A hob of this kind is disclosed in EP 0 050 270 A2. Hobs of this kind having helical tooth profiles are usually used for producing tooth profiles on gearwheels, for example on spur gears for transmissions. In order to form the helical tooth profile of the hob, cutting bodies are usually arranged in a distributed manner along a helix. These cutting bodies are often formed as cutting inserts, in particular indexable cutting inserts, which are secured in an exchangeable manner to a cross-sectionally roof-shaped carrier.

DE-A 27 00 525 discloses a multipart hob, in which the tooth profile is formed by a plurality of encircling disks which are arranged in a row and each carry a disk-like gear rim. The individual disks are formed as annular disks which are arranged on a basic body in a row in the longitudinal direction.

In operation, not only the cutting bodies but also the insert seats for the cutting inserts can become worn, and so the cutting insert support, into which the insert seats are incorporated, also has to be replaced from time to time.

In order to avoid disassembling the hob known from DE-A 27 00 525 into its individual components, it is provided according to EP 0 050 270 A2 for the tooth profile of the hob to be formed by tooth segments that adjoin one another in the circumferential direction, with the individual tooth segments being secured in a thread-shaped guide of the basic body.

In this configuration, it is therefore necessary to produce the basic body with an attached helical guide in a comparatively complicated manner.

SUMMARY OF THE INVENTION

The object of the invention is to specify a hob which is easy to produce.

The object is achieved according to the invention by a hob having the features of claim 1. Preferred configurations of the hob can be gathered from the dependent claims.

The hob is characterized in that a multiplicity of individual segments are provided in order to form the helical tooth profile, said segments being secured to a usually cylindrical basic body. Each individual segment covers in this case a limited angular range and has preferably only precisely one helical turn. The segments themselves comprise in each case a segment root and a segment profile. They are secured to the basic body by way of the segment root. The segment profile is therefore a portion of the helical tooth profile. The segment profile is arranged in an oblique manner on the segment root. The segment root itself extends preferably perpendicularly to the longitudinal direction, so that lateral surfaces that are adjacent to the segment root run perpendicularly to the longitudinal direction over their entire length.

The particular advantage of this configuration can be seen in that fact that, on account of the oblique orientation of the segment profile with regard to the segment root, the helix pitch of the tooth profile within each individual segment is reproduced by the oblique position of the segment profile. On account of this measure, it is therefore possible to dispense with an additional helical guide on the basic body. The basic body itself is therefore formed without a helical guide. The tooth profile is preferably formed solely by arranging the individual segments in a row on the one hand in the circumferential direction and on the other hand in the longitudinal direction of the basic body.

The expression helix pitch is generally understood to mean the distance between two portions of the helix of the tooth profile following a revolution through 360° in the longitudinal direction.

On account of this configuration, the hob is easy to assemble and produce. All that is needed is to secure the individual segments to the hob. The hob is formed in an easy manner as a cylindrical body. The individual segments themselves are likewise comparatively easy to produce.

Expediently, the segment profile is arranged obliquely on the segment root at an angle which correlates with the helix pitch of the entire tooth profile. As a result, in a simple configuration, the segment root can have a cuboidal shape in plan view. During assembly, the individual segment roots are arranged in a simple manner in an orientation perpendicular to the longitudinal direction in a row adjacent to one another starting from a stop at the edge.

Furthermore, it is preferably provided that the segment root has a width which corresponds to the helix pitch. Thus, no further spacer elements are necessary between two adjacent segment roots which are adjacent to one another in the longitudinal direction within a row.

With regard to easy assembly, the segments of one row are arranged without an offset with respect to one another as seen in the circumferential direction. The individual segments are thus oriented in the longitudinal direction of the basic body.

Expediently, it is therefore provided that an even number of segments cover exactly 360° and preferably the individual segments which are adjacent to one another have the same segment angle, i.e. they cover in each case the same angle. Preferably, three segments are provided, each at 120°, per circumference. Alternatively, these segments can also cover different angles.

In order to ensure that the segment profiles that are adjacent to one another in the circumferential direction merge into one another in a flush manner and without an offset, the segment roots of two segments that are adjacent to one another in the circumferential direction are arranged in a manner offset with respect to one another in the longitudinal direction. The offset in the longitudinal direction corresponds here preferably to the proportion of the helix pitch that is reproduced by the respective segment profile. This proportion depends here on the segment angle which is covered by the respective segment. In this case, the offset x is determined in particular generally by the formula:

$$x = \frac{\alpha}{360°} \times s,$$

wherein $\alpha$ is the segment angle which is covered by the segment and s is the helix pitch. In the case of a 120° segment, the offset is therefore ⅓ of the helix pitch.

This offset is preferably formed in a simple manner in that a compensating segment is arranged at the edge of each row and has a compensating width which corresponds to the offset required. Generally, the compensating width is selected in such a way and is correlated with the helix pitch, that two segment roots that are adjacent to one another in the circumferential direction are arranged in an offset manner with respect to one another in the longitudinal direction so that their segment profiles adjoin one another in a flush manner.

With regard to positionally accurate and easy assembly, the basic body has guides that run preferably in the longitudinal direction and along which the segments are positioned on the basic body. Expediently, it is provided here that adjacent segments butt against one another in each case at the guides, so that one guide is used for in each case two adjacent segments.

The guides are in this case preferably formed by grooves, in which there is accommodated an insert element which protrudes out of the groove incorporated into the basic body and thus forms a kind of stop as a guide for the segments. Expediently, the insert element is formed here as what is known as a feather key, which in the simplest case is an elongate profile element that is made in particular of metal and preferably formed in length, width and cross-sectional form in such a way that it is accommodated in the respective groove up to a tolerance margin. This configuration with the grooves in the basic body and the feather key arranged therein makes it possible to produce the basic body easily, since it is only necessary to incorporate in a simple manner, for example by milling, grooves that run in the longitudinal direction.

Expediently, it is furthermore provided that the segments have receptacles, into which the feather key engages, at their segment roots. The receptacles are formed in this case expediently at the edge. Two mutually adjacent receptacles of adjacent segment roots therefore together cover the width of the feather key.

In order to secure the elements to the basic body, the latter expediently has screw holes. In this case, at least one, preferably several, for example two or three, screw holes are provided for each of the segments. The screw holes of one row of segments form rows of screw holes, wherein the screw holes of segments which are adjacent to one another in the circumferential direction are arranged in a manner offset with respect to one another in the longitudinal direction. The offset corresponds here to the offset of the segment roots.

Preferably, there are provided different types of segments which are arranged alternately in the circumferential direction of the basic body. Preferably, there are provided here in particular two different types, which differ only with regard to the arrangement of cutting bodies. The cutting bodies are generally formed preferably as indexable cutting inserts. The indexable cutting inserts are furthermore preferably arranged generally in the manner of staggered toothing alternately on an inside and an outside of a roof-shaped cross-sectional profile of the segment profiles. The arrangement of the cutting bodies on the segment profiles of different types is now chosen such that the desired alternating arrangement of the cutting bodies is ensured in the case of staggered toothing, even in the case of successive segment profiles.

For a simple construction of the hob, the basic body expediently has at one end an annular stop, on which the individual segments or compensating segments are positioned.

The basic body is formed preferably as a hollow cylinder to be secured preferably in a form-fitting manner on a driveshaft of a machine tool.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

FIG. 1 shows a perspective view of a hob;

FIG. 2A-2C respectively show a side view and an end view of a basic body having in each case a row of segments extending in the longitudinal direction;

FIG. 3A-3C show different views of a first segment type;

FIG. 4A-4C show different views of a second segment type; and

DETAILED DESCRIPTION OF THE INVENTION

Figure 5:
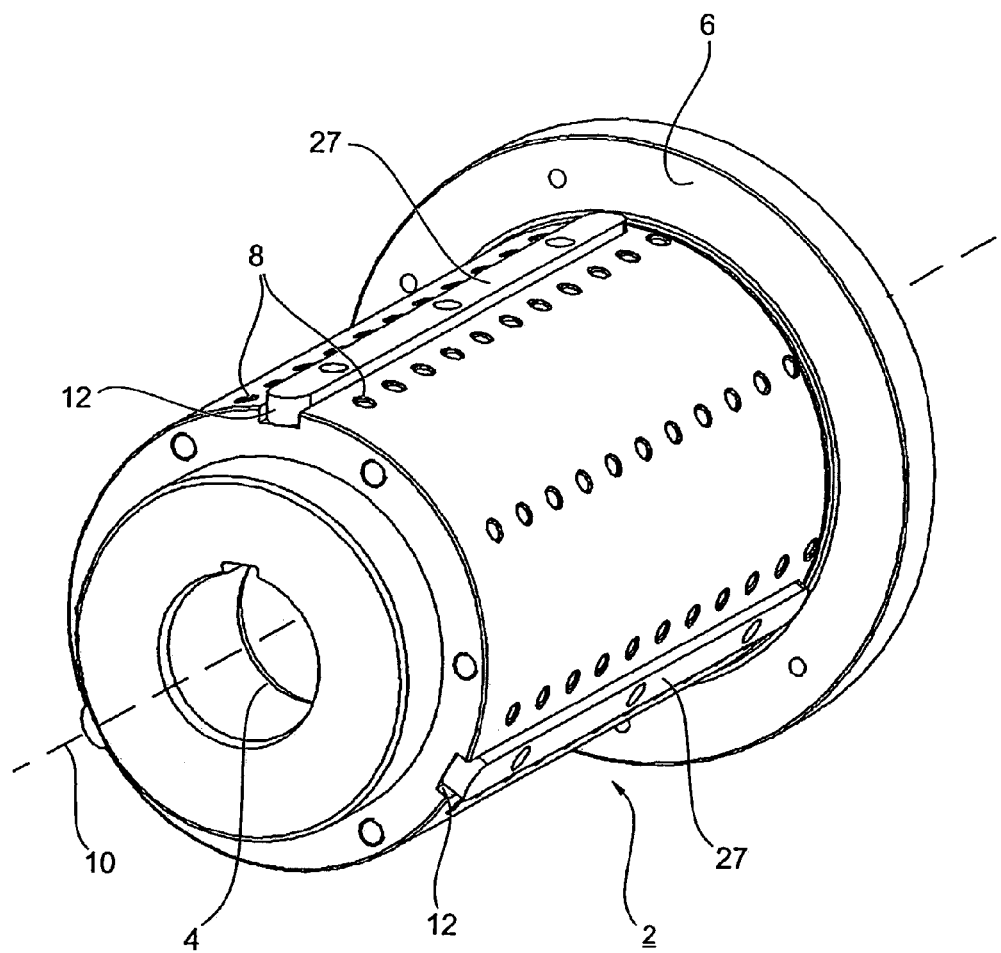
FIG. 5 shows a perspective illustration of a basic body.

In the exemplary embodiment, the hob comprises a hollow cylindrical basic body 2 which is formed in the manner of a drum and to which a tooth profile 3 has been attached. The tooth profile 3 is wound helically on the lateral cylinder surface of the basic body 2 with a helix pitch s (cf. FIG. 2B). The basic body 2 (cf. in this regard in particular FIG. 5) has a central shaft receptacle 4, with which it can be secured to a driveshaft of a machine tool. At its rear end, the basic body 2 has an annular stop 6. A plurality of rows of screw holes 8 are provided in the lateral surface of the basic body 2. Introduced alongside these are grooves 12 that run in the longitudinal direction 10.

Fitted to this basic body 2 are a multiplicity of individual segments 14A,B, the detailed structure of which can be gathered in particular from FIGS. 3A to 3C and 4A to 4C.

As can be seen from FIGS. 2A to 2C, the individual segments 14A,B are secured to the lateral surface of the basic body 2 in a manner arranged in rows in the longitudinal direction 10, so that in each case individual rows 16 that form a lateral surface sector are formed. Each row 16 has preferably at least five segments. In the exemplary embodiment, each row 16 covers a segment angle α of exactly 120°. Preferably, the segments 14A,B of each row 16 are arranged without an offset with respect to one another in the circumferential direction.

FIG. 2A shows in this case the row 16 that forms a first sector, FIG. 2B the row 16 that forms a second sector and FIG. 2C the row 16 that forms a third sector.

The individual segments 14A,B are in each case formed from a segment root 18 and from a segment profile 20 formed on the segment root 18. The segments 14A,B are preferably integrally formed, and are thus worked from one workpiece. The segment profiles 20 of the individual segments 14A,B form as a whole the helical tooth profile 3.

As can be seen from the side illustrations in FIGS. 2A to 2C, in each case compensating segments 26 are arranged at the edge—as seen in the longitudinal direction 10—of the individual rows 16. These compensating segments 26 cause two adjacent segments 14A,B to be offset with respect to one another in the longitudinal direction 10. This ensures that the segment profiles 20 of two segments 14A,B that are adjacent to one another in the circumferential direction are flush with one another. The width of these compensating segments 26 is selected accordingly. As can be seen from FIG. 2A, the first segment 14A of the first sector is secured directly adjacent to the annular stop 6. In the case of the second sector, first of all a thin compensating segment 26 is arranged at the annular stop 6, the width of said compensating segment 26 corresponding to a third of the width of a normal segment 14A,B. A compensating segment 26 of this kind having a ⅓ width is in turn provided at the end opposite the annular stop 6.

Finally, in the case of the third sector according to FIG. 3C, a compensating segment 26 having a ⅔ width is arranged directly at the annular stop 6. The compensating segments 26 are formed substantially by modified segment roots 18.

The width B of each segment 14A,B is determined by the segment root 18. The width B corresponds here to the helix pitch, that is the distance (in the longitudinal direction 10) between two portions of the helix of the tooth profile 3 following a revolution through 360°. The pitch and thus the width B lie for example in the region of 22 mm. In the exemplary embodiment, each row 16 comprises a total of eleven segments 14A,B.

The individual segments 14A,B, or the individual rows 16 butt against one another centrally over the grooves 12. Insert elements, specifically feather keys 27, are inserted into these grooves 12, said insert elements on the one hand being accommodated in the grooves 12 but on the other hand engaging in corresponding receptacles 28 (cf. in particular FIGS. 3A, 4A) at the edge of the segment root 18. Together with the feather keys 27 the grooves 12 form guides for the segments 14A,B.

In the exemplary embodiment, the segments 14A,B are preferably designed to cover in each case the same angular range (segment angle α). As an alternative, the division of the individual segments 14A,B can also be unequal.

In the exemplary embodiment, preferably precisely two different segment types, specifically the segments 14A (FIG. 3A to 3C) and the segments 14B (FIG. 4A to 4C) are provided.

When the hob is put together, the two segment types 14A,B are secured in each case in a manner alternating with one another in the circumferential direction. In the circumferential direction, in each case one type B segment is therefore arranged between two type A segments. In the geometry selected in the exemplary embodiment, this means that the different segment types are arranged in each case in an alternating manner in the longitudinal direction 10, too.

As is apparent from FIGS. 3A and 4A, the segments 14A,B are formed in the manner of annular segments. In the exemplary embodiment, the inside diameter $d_i$ of each segment 14A,B (and thus the outer radius of the lateral cylinder surface of the basic body 2) is approximately 165 mm. In the exemplary embodiment, the outside diameter $d_a$ of the annular segment is for example 270 mm.

The segment profile 20 is approximately roof-shaped in cross section. Arranged on each of the roof sides are cutting bodies 30, which are formed preferably as indexable cutting inserts. The cutting bodies 30 are in this case arranged in each case in a manner alternating in pairs on one or the other roof side.

As can be seen in particular from FIGS. 3B, 4B, the roof-shaped segment profile 20 runs obliquely with respect to the longitudinal direction 10. The helix pitch of the helical tooth profile 3 is thus reproduced by the oblique position of the segment profile 20 on the segment root 18. the segment root 18 itself is—as seen in a radial projection—formed in a rectangular manner so that its longitudinal sides run parallel to the annular stop 6 or perpendicular to the longitudinal direction 10.

The difference in the configuration of the two segment types 14A,B can be seen from a comparison of FIGS. 3B and 4B. The segment profile 20 is arranged specifically in a manner rotated merely through approximately 180° with respect to a segment center M. As a result, in the segment type A according to FIG. 3A, at the edge of the segment 14A in each case a pair of cutting bodies 30 is provided on the side which is remote from the annular stop 6. Conversely, the pairs of cutting bodies 30 at the edge in type B are arranged on the side which is remote in FIG. 4A and oriented towards the annular stop 6. Apart from this arrangement of the segment profile 20 rotated through 180° with regard to the center point M, the segments 14A,B are formed in an identical manner.

In the exemplary embodiment, each segment 14A,B is secured to the basic body 2 by in each case three screws 24. The screws 24 are locked following assembly, for example using grub screws, and adhesively bonded. This prevents the ingress of dirt.

The patents and publications referred to herein are hereby incorporated by reference.

Having described presently preferred embodiments the invention may be otherwise embodied within the scope of the appended claims.

What is claimed is:

1. A hob comprising a helical tooth profile in which a plurality of segments that cover only a limited angular range are secured to a basic body in order to form the helical tooth profile, wherein the segments are adjacent to one another in the circumferential direction of the basic body and also form rows in the longitudinal direction of the basic body, wherein each segment have a segment root and a segment profile which is arranged obliquely in the longitudinal direction on the segment root, and wherein the tooth profile has a helix pitch and the segment profile of the helix pitch is arranged in a corresponding manner on the segment root, and wherein a compensating segment is arranged at the edge of one row and has a compensating width which is correlated with the helix pitch, such that two segment roots that are adjacent to one another in the circumferential direction are arranged in an offset manner in the longitudinal direction so that their segment profiles adjoin one another in a flush manner, and wherein the segment profile or two different types of segments is arranged in a manner rotated 180 degrees with respect to a segment center (M).

2. The hob as claimed in claim 1, wherein the segment root has a width (B) which corresponds to the helix pitch.

3. The hob as claimed in claim 1, wherein the segment roots of two segments that are adjacent to one another in the circumferential direction are arranged in a manner offset with respect to one another in the longitudinal direction.

4. The hob as claimed in claim 1, wherein each of the segments covers an equal segment angle (α).

5. The hob as claimed in claim 1, wherein the basic body has guides that run in the longitudinal direction and along which the segments are positioned on the basic body.

6. The hob as claimed in claim 5, wherein adjacent segments butt against one another at the guides.

7. The hob as claimed in claim 5, wherein the guides have grooves, in which in each case one insert element is accommodated and the segments have receptacles for the insert element at their segment roots.

8. A hob comprising a helical tooth profile in which a plurality of segments that cover only a limited angular range are secured to a basic body in order to form the helical tooth profile, wherein the segments are adjacent to one another in the circumferential direction of the basis body and also from rows in the longitudinal directional of the basic body, wherein each segment have a segment root and a segment profile which is arranged obliquely in the longitudinal direction on the segment root, and wherein the tooth profile has a helix pitch and the segments profile of the helix pitch is arranged in a corresponding manner on the segment root, and wherein a compensating segment is arrange at the edge of one row and has a compensating width which is correlated with the helix pitch, such that two segment root that are adjacent to one another in the circumferential direction are arrange in an offset manner in the longitudinal direction so that their segment profile adjoin one another in a flush manner, and wherein screw holes for securing the segments are provided in the basic body and the screw holes form rows of screw holes that run in the longitudinal direction, and wherein the screw holes of mutually adjacent segments are arranged in a manner offset with respect to one another in the longitudinal direction.

9. The hob as claimed in claim 1, wherein different types of segments are arranged alternately in the circumferential direction of the basic body.

10. The hob as claimed in claim 1, wherein the basic body has an annular stop for the segments.

11. The hob as claimed in claim 1, wherein the basic body is formed as a hollow cylinder to be secured in particular in a form-fitting manner on a driveshaft of a machine tool.

* * * * *